(12) United States Patent
Torres et al.

(10) Patent No.: US 8,169,958 B2
(45) Date of Patent: May 1, 2012

(54) OBTAINING INFORMATION REGARDING SERVICES AVAILABLE FROM A WIRELESS LOCAL AREA NETWORK

(75) Inventors: Esteban Raul Torres, San Francisco, CA (US); James Edward Burns, Stratham, NH (US); David S. Stephenson, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 932 days.

(21) Appl. No.: 12/057,156

(22) Filed: Mar. 27, 2008

(65) Prior Publication Data
US 2009/0245184 A1 Oct. 1, 2009

(51) Int. Cl.
*H04B 7/212* (2006.01)
(52) U.S. Cl. ........ 370/329; 370/341; 370/431; 370/437; 455/434; 455/450; 455/464; 455/509; 455/515
(58) Field of Classification Search .......... 370/329, 370/341, 431, 437; 455/434, 450, 464, 509, 455/515, 466
See application file for complete search history.

(56) References Cited

U.S. PATENT DOCUMENTS

| | | | |
|---|---|---|---|
| 6,745,237 B1 * | 6/2004 | Garrity et al. ............... | 709/219 |
| 7,483,984 B1 | 1/2009 | Jonker et al. | |
| 2005/0198292 A1 | 9/2005 | Duursma et al. | |
| 2006/0123116 A1 * | 6/2006 | Rahman et al. ............ | 709/227 |
| 2007/0086465 A1 * | 4/2007 | Paila et al. .................. | 370/394 |
| 2007/0264991 A1 | 11/2007 | Jones et al. | |
| 2010/0120450 A1 | 5/2010 | Herz | |

FOREIGN PATENT DOCUMENTS
WO  WO 03/007553  1/2003

OTHER PUBLICATIONS

International Search Report and Written Opinion for International Application No. PCT/US2009/036018 dated May 27, 2010.
"802.11 Wereless Network Policy Recommendation for Usage Within Unclassified Government Networks", Howard Feil; vol. 2, Oct. 13, 2003; pp. 832-883; XP010698595.
International Preliminary Report on Patentability and Written Opinion of the International Searching Authority for PCT/US09/36018 dated Oct. 7, 2010.
http://www.muniwireless.com/2009/06/23/boingo-awarded-patent-for-hotspot-access/; "Boingo Awarded Patent for Hotspot Access", Jun. 23, 2009; Esme VOS, Lemon Cloud BV.

* cited by examiner

*Primary Examiner* — Jeffrey Pwu
*Assistant Examiner* — Abdelnabi Musa
(74) *Attorney, Agent, or Firm* — Tucker Ellis & West LLP

(57) ABSTRACT

In accordance with an example embodiment, there is disclosed herein an application launcher, referred to herein as a "Concierge Launcher," that enables a mobile device to access a wireless local area network (WLAN) and launch an application with one click. In an example embodiment, the WLAN advertises one or more services, for example a Concierge Service, along with the identity of the provider of the service and optionally a Uniform Resource Indicator (URI) for the application to use the service. The mobile device is configured to detect the advertisement and notify an end user of the availability of the service. If the end user selects the service, the provider of the service is validated, and an application, such as a web browser, on the mobile device configured to use the service is started.

16 Claims, 7 Drawing Sheets

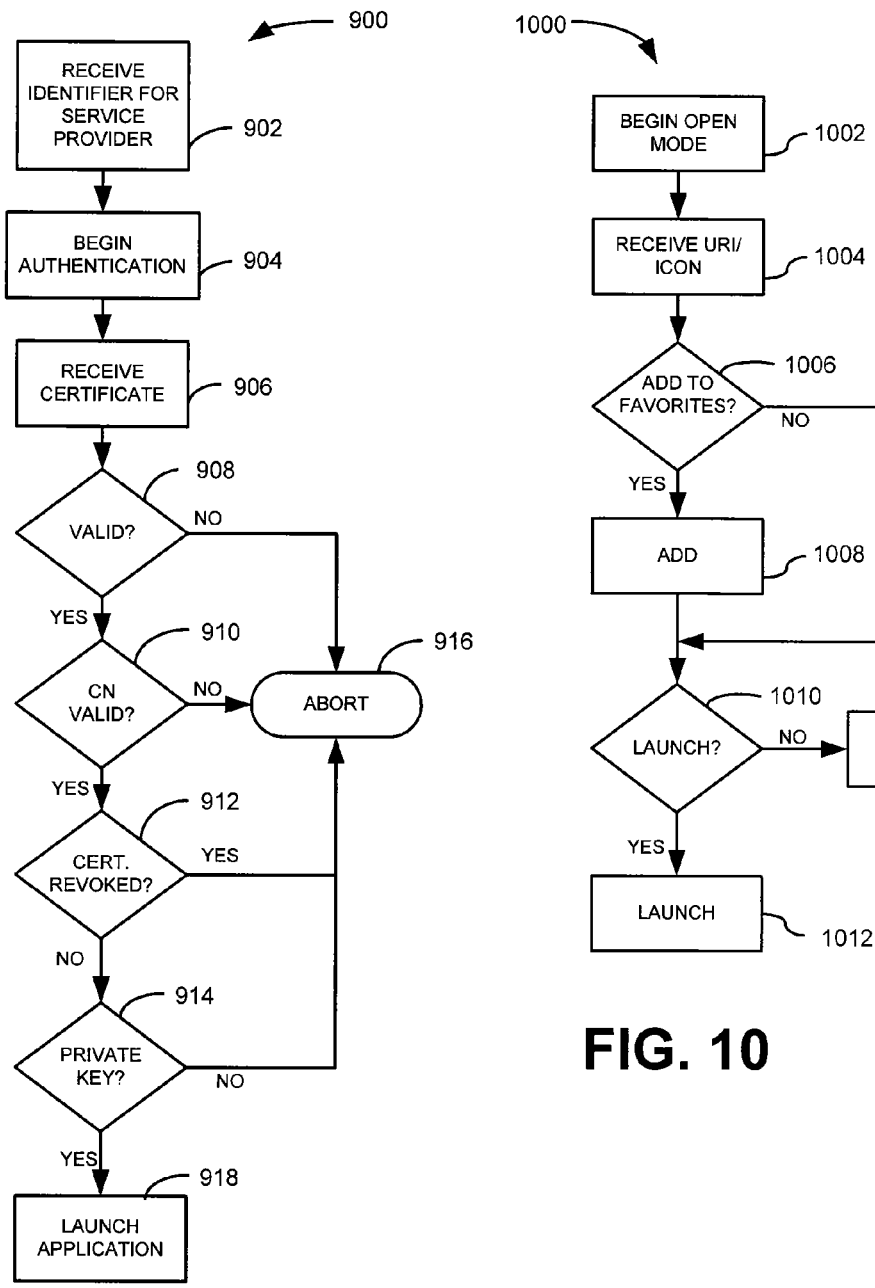

ns. The figures generally indi-

OBTAINING INFORMATION REGARDING SERVICES AVAILABLE FROM A WIRELESS LOCAL AREA NETWORK

TECHNICAL FIELD

The present disclosure relates generally to accessing wireless network services.

BACKGROUND

Wireless local area networks (WLANs) have grown in popularity in recent years. Wireless networks allow users with wireless capable devices such as wireless phones, personal digital assistants (PDAs), and laptop computers to access data. In order for a guest to access a WLAN, however, the guest has to first acquire authentication credentials a priori, turn on a wireless interface such as a Wi-Fi transceiver on a dual-mode phone or laptop, scan for service set identifiers (SSIDs), select the correct SSID, input the authentication credentials, and then launch the appropriate application to obtain data from the WLAN. Much of this information is provided out-of-band via person-to-person communication or signs or some other means.

BRIEF DESCRIPTION OF THE DRAWINGS

The accompanying drawings incorporated herein and forming a part of the specification illustrate the example embodiments.

FIG. 9 illustrates an example methodology for validating a selected WLAN.

FIG. 10 illustrates an example methodology for adding a WLAN to a contact list.

OVERVIEW OF EXAMPLE EMBODIMENTS

Figure 1:
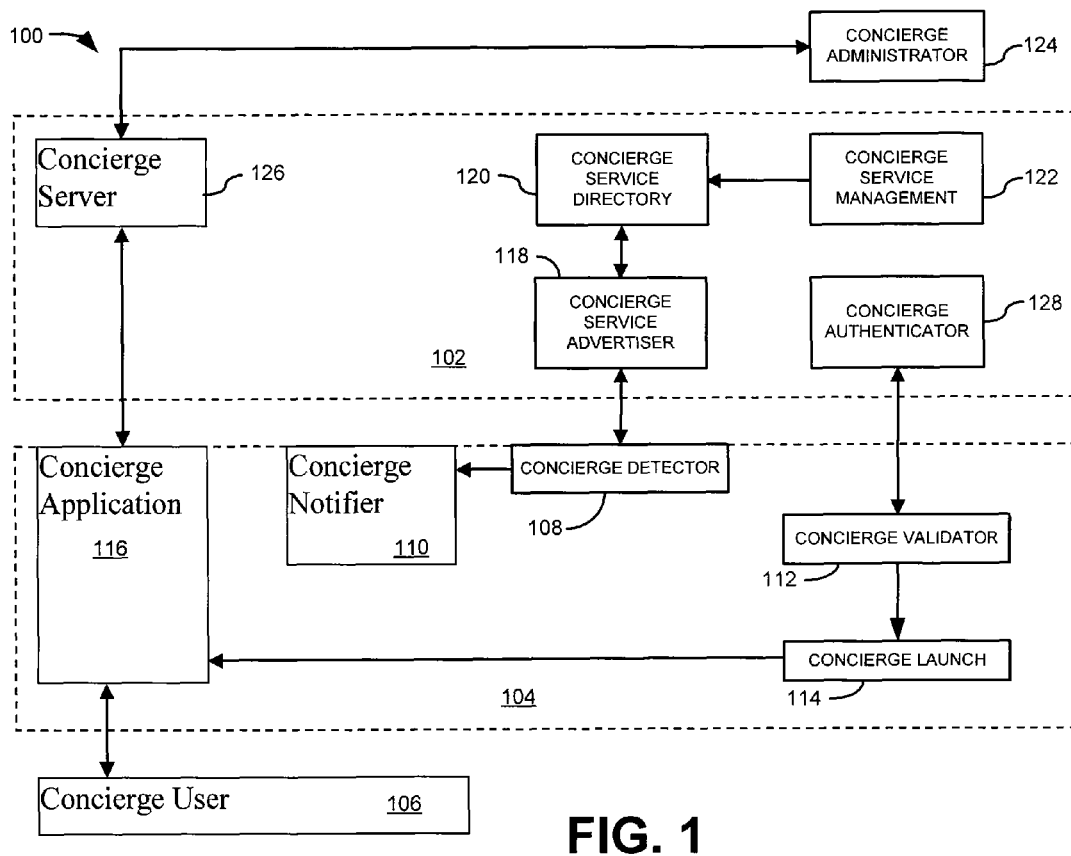
FIG. 1 illustrates a functional diagram for an example Concierge system.

The following presents a simplified overview of the example embodiments in order to provide a basic understanding of some aspects of the example embodiments. This overview is not an extensive overview of the example embodiments. It is intended neither to identify key or critical elements of the example embodiments nor to delineate the scope of the appended claims. Its sole purpose is to present some concepts of the example embodiments in a simplified form as a prelude to the more detailed description that is presented later.

In accordance with an example embodiment, there is disclosed herein an application launcher, referred to herein as a "Concierge Launcher," that enables a mobile device to access a wireless local area network (WLAN) and launch an application with one click. In an example embodiment, the WLAN advertises one or more services, for example a Concierge Service, along with the identity of the provider of the service and a Uniform Resource Indicator (URI) for the application to use the service. The mobile device is configured to detect the advertisement and notify an end user of the availability of the service from a particular provider. If the end user selects the service, the provider of the service is validated, and an application, such as a web browser, on the mobile device configured to use the service is started.

In an example embodiment described herein, there is disclosed an apparatus comprising a wireless transceiver, an input device, an output device, and control logic operatively coupled to the wireless transceiver, the input device, and the output device. The control logic is responsive to a signal received from a wireless network by the wireless transceiver, the signal comprising data indicating a service is available for an application on the wireless network and the provider of that service, and to output data on the output device indicating that the service is available for the application on the network from a particular provider. The control logic is responsive to receiving input from the input device indicating the service is requested to validate the wireless network and to initiate the application to receive the service responsive to successfully validating the wireless network.

In an example embodiment described herein, there is disclosed a method comprising receiving a signal from a wireless network that comprises data indicating a service is available for an application from a particular provider. The data is output to indicate the service from a particular provider is available for the application from the wireless network. An input is received requesting the service. The wireless local area network advertising the service is validated. An application is launched to receive the service responsive to successfully validating the wireless network.

DESCRIPTION OF EXAMPLE EMBODIMENTS

This description provides examples not intended to limit the scope of the appended claims. The figures generally indicate the features of the examples, where it is to be understood and appreciated that like reference numerals are used to refer to like elements. Reference in the specification to "one embodiment" or "an embodiment" or "an example embodiment" means that a particular feature, structure, or characteristic described in connection with the embodiment is included in at least one embodiment described herein. The appearances of the phrase "in one embodiment" or "in one or more embodiments" in various places in the specification are not necessarily all referring to the same embodiment, nor are separate or alternative embodiments mutually exclusive of other embodiments. Features and aspects of various embodiments may be integrated into other embodiments, and embodiments illustrated in this document may be implemented without all of the features or aspects illustrated or described.

In an example embodiment disclosed herein, disclosed is a technique that provides an end user with a mobile device (a device configured to communicate with a wireless local area network using any suitable protocol such as WiFi, WiMax, etc.) to be able to get help finding products, friends, other help, and physical services within a local area such as a retail store, sports venue (e.g. stadium, racetrack, etc.), etc. The service, referred to herein as a "Concierge service," allows an end user entering a physical location to determine from their mobile device whether a Concierge service is available and to identify the Concierge service provider. The user can select the service with one 'click' (e.g. a mouse selection or other manual data entry indicating that the Concierge service from a particular provider is desired; however, example embodiments may also include voice-activated services enabling the service to be requested by speaking a single command). The user begins to receive those services from the WLAN upon request.

In an example embodiment, the Concierge application outputs an enterprise icon that is also an audiovisual prompt onto a mobile device such as a dual mode wireless phone (e.g., a phone which has both an embedded Wi-Fi and cellular radios) when the mobile device comes within range of a Concierge-enabled WLAN. The user of the mobile device clicks on the enterprise icon, which launches an application for communicating with the concierge portal.

In an example embodiment, the Concierge Launcher allows the consumer user to determine which icons pop up on the mobile device since the Concierge is part of the settings menu of the mobile device, for example on a dual mode phone. To configure the settings of the Concierge application, the user clicks on "Concierge settings" and opens up the settings menu. The user has the option of turning Concierge services "on" or "off." By turning Concierge services off, no icons pop up on the mobile device, even if the Wi-Fi radio is on.

By turning Concierge services "on," the user consents to have icons show up on his or her handset. In an example embodiment, there are two modes to the "on" setting of the Concierge, e.g. open and closed mode. In the open mode, the consumer gets the icons of any enterprise with a Concierge-enabled WLAN. In closed mode, only the icons of the enterprises that the user has selected "pop up" (e.g. My Favorites). For example, if the user has selected Target but not Best Buy, then the Target icon pops up when the consumer walks by Target, but the Best Buy icon does not pop up when the consumer walks by Best Buy if the consumer has Concierge Launcher in "closed" mode. However, both icons pop up if the Concierge Launcher is in "open" mode. No icons pop up if the Concierge Launcher is "off." In an example embodiment, there is sub-mode to "closed" mode, in which consumer can choose to let icons for services that he has not seen before, as well as icons in "My Favorites," pop up.

A user can manage his selected icons with "My Favorites." To delete an icon so that it does not pop up when Concierge Launcher is in closed mode, the user opens my "My Favorites," clicks on the icon, and clicks on delete. To add an enterprise icon, the consumer first needs to collect the icon. The user can go into enterprise locations with Concierge in open mode. As icons are displayed by the mobile device, the user can enter selected icons into My Favorites or can set the mobile device to automatically insert all detected icons into My Favorites. If at some point the user decides that he no longer wants the icon, then the user deletes the icon as described herein above.

In an example embodiment, a user can sign up for Concierge service at an enterprise's web site and receive a SMS (Short Message Service) link with the Concierge Launcher and the enterprise's icon. In an example embodiment, a service provider (e.g. Cisco) can offer users the ability to select enterprise icons for the Concierge Launcher and receive them via SMS. Finally, users also can download the icons onto mobile devices such as a phone by synchronizing their computer with the phone and enterprise's web site or service provider web site.

In an example embodiment, a handset manufacturer or carrier may build or install Concierge Launcher into the handset so that a consumer would not have to do so. For example, there are two general classes of phones today, i.e. locked and unlocked phones. Unlocked phones are sold by manufacturer, and the manufacturer can install the Concierge Launcher and sell Concierge-enabled phones to consumers. However, locked phones are sold by carriers. Some carriers may want to monetize Concierge Launcher by selling Concierge-enabled phones with the Launcher built in but inactive. The user would have to sign onto a premium data package with the carrier to activate the Concierge Launcher. Otherwise, the consumer would not receive any icons when he entered a Concierge-enabled WLAN.

FIG. 1 shows the functional elements in the full Concierge solution 100. One skilled in the art should readily appreciate that the blocks in FIG. 1 represent logical components. More than one logical component may be implemented by one processor, or the logic for performing one function may be dispersed among several processes. "Logic," as used herein, includes but is not limited to hardware, firmware, software, and/or combinations of each to perform a function(s) or an action(s) and/or to cause a function or action to be performed by another component. For example, based on a desired application or need, logic may include a software-controlled microprocessor, discrete logic such as an application specific integrated circuit (ASIC); a programmable/programmed logic device, memory device containing instructions, or the like; or combinational logic embodied in hardware. Logic also may be fully embodied as software.

The functional components encompassed by 102 are functional components implemented by the Concierge service provider on the WLAN. The function components encompassed by 104 are functional components implemented at the mobile device.

Concierge User 106 refers to the end user of the Concierge service, e.g. the person operating mobile device 104. Concierge Detector 108 is a network utility that detects the presence or absence of Concierge service and reports this to the Concierge Notifier 110. Concierge Notifier 110 is a user interface element that receives an indication from Concierge Detector 108 that there has been a change in Concierge Service availability and displays this change to end user 106. Concierge Notifier 110 also allows end user 106 to select a desired Concierge service from a particular provider and then delivers the selection to Concierge Validator 112 to validate the provider of the Concierge service. If the Concierge Validator 112 successfully validates the Concierge service provider, the Concierge Application is launched by Concierge Launch 114. Concierge Launch 114 is a utility that accepts a Concierge Application 116 to be launched and launches it. Concierge Application 116 is the application that provides the Concierge service to end user 106.

Concierge Service Advertiser 118 is a functional element that advertises the presence of one or more Concierge services. The specific services that are advertised are obtained from Concierge Service Directory 120. Concierge Service Directory 120 is a functional element that maintains an information store that lists the Concierge services that are available. Concierge Service Directory 120 provides this information to the Concierge Service Advertiser 118. The information store is managed by the Concierge Service Management system 122. Concierge Service Management 122 is an application that provides a user interface to the Concierge Service Administrator 124, allowing Concierge Service Administrator 124 to add/remove or edit the Concierge services that are available. This application will contact the Concierge Service Directory 120 in order to read and write the information.

Concierge Server 126 is a server that communicates with the Concierge Application 116 to provide the Concierge services to a Concierge User 106. Concierge authenticator 128 provides validation data to Concierge Validator 112 during validation.

Figure 2:
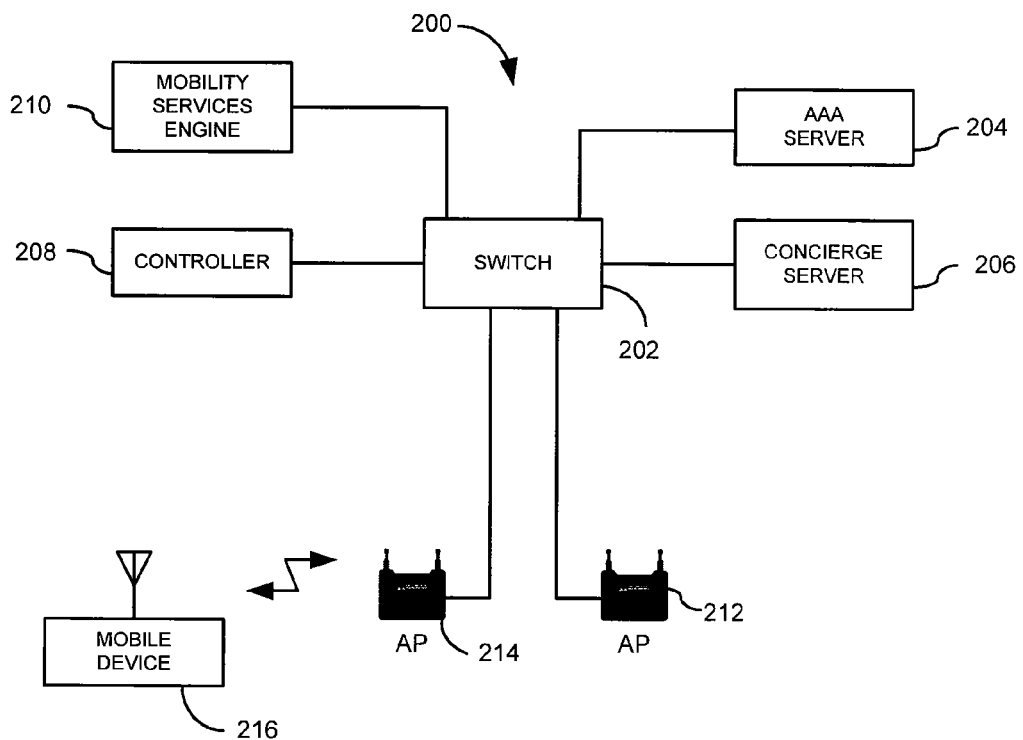
FIG. 2 illustrates an example network architecture configured for providing Concierge services.

FIG. 2 illustrates an example network architecture for a network 200 providing Concierge services. The example network architecture is employed to illustrate the distribution of the functional components illustrated in FIG. 1. In the illustrated example, Access Point (AP) 212 and AP 214 are coupled to switch 202. Switch 202 is coupled to Authentication Authorization Accounting (AAA) server 204, Concierge Server 206, Controller 208, and Mobility Services Engine 210. A mobile device 216 is illustrated as being in wireless communication with AP 214.

In an example embodiment, APs 212, 214 and/or switch 202 are configured with Concierge Service Advertiser 118 (FIG. 1). Mobility Services Engine 210 is configured with Concierge Service Directory 120. Controller 208, which may suitably comprise one or more wireless controllers, comprises Concierge Service Management application 122. Concierge server 206 implements the functionality of Concierge Server 126 described in FIG. 1. AAA server 204 implements Concierge Authenticator 128. Mobile device 216 is configured to implement Concierge Application 116, Concierge Notifier 110, Concierge Detector 108, Concierge Validator 112, and Concierge Launch 114.

In operation, Concierge Server 206 provides the actual service. For example, Concierge Server 206 can be a web server configured to provide web page data. Concierge Server 206 and Mobility Services Engine 210 may communicate with each other to provide location-based services. For example, Mobility Services Engine 210 may provide Concierge Server 206 with directories available for the current location of mobile device 216. For example, when mobile device 216 enters within communication range of AP 214, AP 214 may send beacons advertising that it supports Service Directory Listing. Alternatively, mobile device 216 can send a probe request, to which AP 214 will respond with a Probe Response advertising that it supports Service Directory Listing. The mobile device 216 may then send a Service Directory Request to AP 214, to which AP 214 will respond with a Service Directory Response indicating the services it supports, the provider of those services, and the URI where the service reside. This service directory may include Concierge Services. Once mobile device 216 learns of the available Concierge services, an output is provided to a user to allow the user to select the service. The output may suitably comprise an icon, a display with the service provider's domain name, and/or an audio output. If the user selects a Concierge service, mobile device 216 validates with WLAN via AAA server 204. If the validation is successful, mobile device 216 launches an application, such as a web browser, that can acquire Concierge data from Concierge Server 206.

Figure 3:
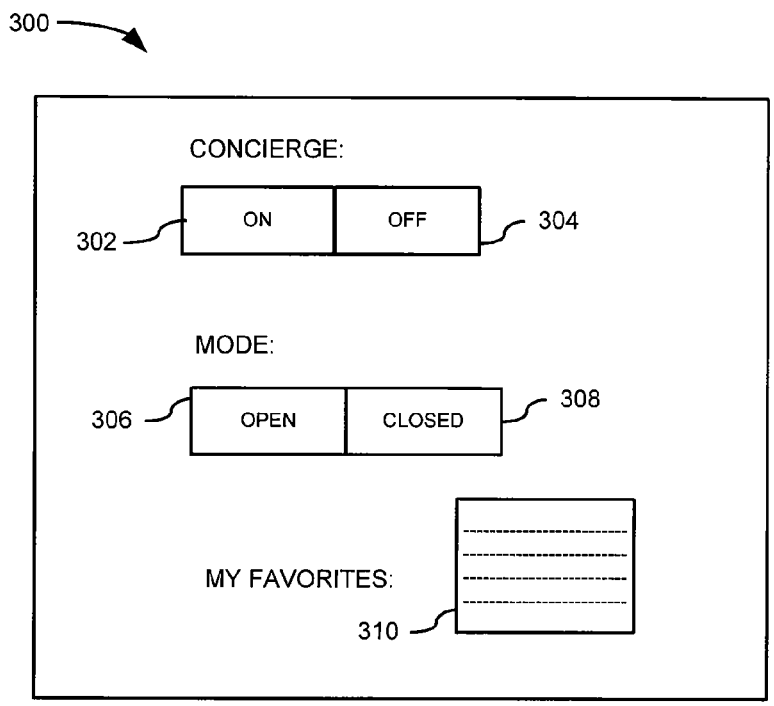
FIG. 3 illustrates an example Concierge services configuration display.

FIG. 3 illustrates an example Concierge settings menu 300. On 302 activates Concierge service, and Off 304 turns Concierge service off. When Concierge is on, the mode that is currently in effect is followed. For example, if Open 306 is selected, the mobile device operates in open mode, and all icons from Concierge Service providers that are detected are displayed. If Closed 308 is selected, the mobile device operates in closed mode, and only icons from My Favorites 310 are displayed when their Concierge Service providers are detected.

For example, to specify whether to allow Concierge icons to pop up on a mobile device, a user clicks on the Concierge icon (not shown) on the mobile device and enters Concierge settings menu 300. The user can turn it "on" by selecting 302 or "off" by selecting 304. By turning Concierge service off, the user does not receive any icons. By turning Concierge service on, the user also turns on a wireless transceiver, such as a Wi-Fi radio, and consents to start receiving icons. The user can then select the mode for Concierge service, e.g. open or closed. In the open mode, icons pop up when the consumer encounters any Concierge-enabled WLANs. In closed mode, only the icons of the Concierge services that he has selected pop up.

Allowing a consumer to manage the mobile device's Concierge settings is a subtle way of resolving invasion of privacy concerns. This shifts the decision for icon pop up from the Concierge provider, such as a retailer, to the user. By placing the Concierge Launcher in the "open" mode, the user has effectively granted permission to enterprises to install their icon on the mobile device. If the user does not want anyone to install an icon, then the user simply turns Concierge "off." On the other hand, if the user only wants icons from a selected list of enterprises, the user places the Concierge in "closed" mode. For example, if a first retailer is in the My Favorites list and the second user is not, a Concierge icon is displayed when the user enters a location for the first retailer that has a WLAN advertising Concierge Service, while no icon is displayed when the user enters a location for the second retailer that has a WLAN advertising Concierge Service.

Concierge service may be provided by many different types of entities. For example, retailers, mall merchants, sports stadiums, resorts, etc. may use this service to provide information to consumers. The Concierge architecture is also extendable beyond consumers to other user groups that come into the entity, such as vendors, employees, etc. A retail store may want to offer Concierge service to each of their vendors so that, when a vendor comes to the store, the vendor's icon pops up on the handset and the vendor can click on it to gain access to the web services for which he is authorized (e.g. VPN to his company's data center). Likewise, the Concierge architecture is also extendable to employees, where an employee can come to work with a dual-mode phone. The employee receives the company's icon when he or she walks in and can click on it to gain access to employee web services. Likewise, a hospital may want to offer Concierge service to doctors, where they can get web services for which they are authorized on their personal handsets. As long as the "service" being launched is a web service, the user does not need a new Concierge Launcher client on the handset. The icons that pop up on the handset are determined by how the user has configured the Concierge Launcher (e.g. open, closed, etc.) The Concierge architecture is extendable to non-web based services, such as handover service (i.e., handover between a Wi-Fi and cellular network), client provisioning, etc. However, this would require modification to the top layer of the Concierge Launcher client.

As another example, the Concierge Launcher architecture can be extended to Home WLAN, whereby consumer devices (e.g. dual-mode phone, car, etc.) can now seamlessly access the Home WLAN and the Home Concierge Service. For example, when a consumer walks to his home, the Home Concierge icon pops up on the user's dual-mode phone, and the user launches his Home Concierge Service by clicking on the icon. As in the Concierge Service in the enterprise segment, the Home Concierge Service consists of web-based Concierge applications that use the unique capabilities of Wi-Fi, as shown above.

From his dual-mode phone, the consumer can now access his work VPN, manage his home entertainment system, place a voice call, etc. Furthermore, the Home Concierge service is not limited to dual-mode phones. A vehicle equipped with Wi-Fi and a web browser can also access the Home Concierge Service. This can enable a consumer to synchronize a home entertainment system with a vehicle's entertainment system to download the latest movies and music into the vehicle's entertainment system over the Home WLAN.

Figure 4A:
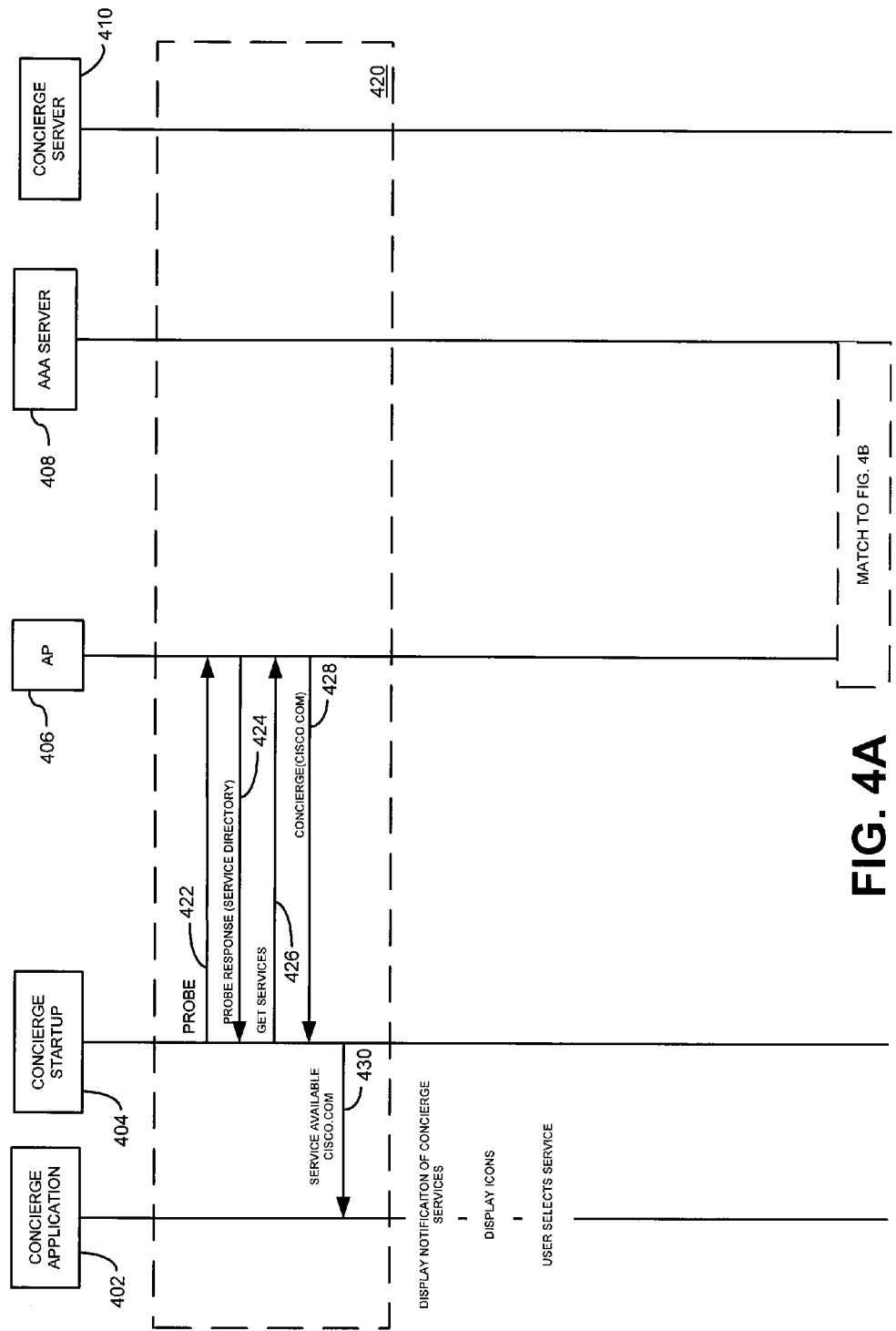
FIG. 4 illustrates an example signal diagram for initiating Concierge services.
Figure 4B:
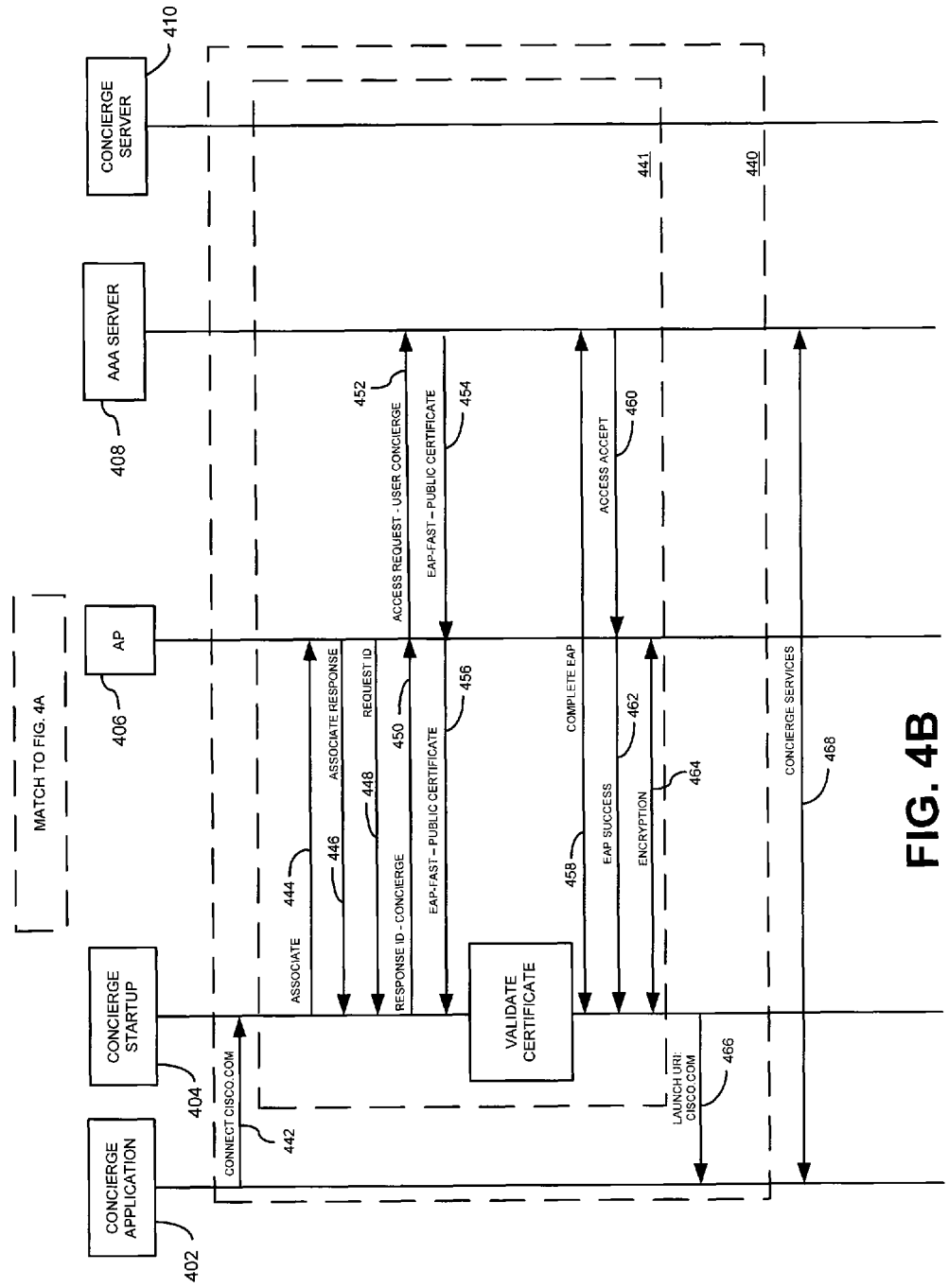

FIG. 4 illustrates an example signal diagram for initiating Concierge services. In this example, a mobile device comprises logic for implementing a Concierge Application 402 and performing Concierge Startup 404. The mobile device communicates with AP 406, which provides access to the WLAN. For example, AP 406 provides communication with AAA server 408 and Concierge Server 410.

The first phase for providing Concierge services is the detection phase 420. In detection phase 420, AP 406 may advertise Directory Listing services, or Concierge Startup may send probe frames asking if Directory Listing services are provided. Directory Listing services may be advertised in Information Elements (IEs) included within beacon frames and probe response frames.

In the illustrated example, Concierge Startup 404 sends a probe request frame 422 to AP 406. AP 406 responds with Probe Response 424 that includes Directory Listing services. At 426, Concierge Startup 404 sends a get services frame to AP 406. AP 406 responds with a frame 428 indicating that Concierge service is available and provides a service provider, Cisco.com in this example. In addition, not shown for space reasons, frame 428 also indicates the service set entry point (Service Set Identifier "SSID," wired port, etc.) and URI where service may be obtained once a connection is created. Concierge startup 404 communicates to Concierge Application 402 that service is available from the service provider, Cisco.com.

Concierge Application 402 performs notification/selection functions. Concierge application 402 displays a notification on an input/output device, such as a user display, that Concierge services are available from a particular provider. In addition, Concierge Application 402 can display icons and domain names for the providers of the Concierge services. If the user selects a Concierge service, launch phase 440, which includes validation phase 441, commences.

During the validation phase 441, a validation protocol is initiated after one or more Concierge service providers (for example, their domain names) has been presented to the end user of the mobile device and the end user has selected a Concierge Service provider. In an example embodiment, the validation process assumes that it has been provided with the desired service set entry point (SSID, wired port, etc.) and the service provider has a verifiable identity (e.g. domain name). The validation process ensures that the WLAN provider (provider of the entry point into the network) is trusted by the advertised service provider. This proof can be accomplished by carrying out an authentication that utilizes a server certificate that is owned by the service provider. The server certificate-based authentication comprises the WLAN provider proving that the WLAN provider is communicating (has a trust relationship) with the entity that is in possession of the service provider's private key. This is done by receiving a server certificate via the WLAN from a AAA server, validating that the certificate chain is signed by trusted certificate authorities, validating that the server certificate possesses a field that matches the domain name of the service provider selected by the end user and carrying out TLS/SSL (Transport Layer Security/Secure Socket Layer) authentication with a AAA server to ensure it possesses the private key that matches the public key within the server certificate This can be accomplished by associating to the WLAN using (WiFi Protected Access) WPA-Enterprise or WPA2-Enterprise association mode and utilizing the Extensible Authentication Protocol (EAP) that carries an EAP-method that supports SSL/TLS. EAP-methods that support SSL/TLS are EAP-PEAP (Protected Extensible Authentication Protocol), EAP-FAST (Flexible Authentication via Secure Tunneling), EAP-TLS, etc. In an example embodiment, the mobile device is configured to accept one or more of the following SSL/TLS methods with password-based inner authentication methods: EAP-PEAP/MSCHAPv2, EAP-PEAP/GTC, EAP-FAST/MSCHAPv2 and/or EAP-FAST/GTC.

During EAP authentication, the mobile unit delivers a fixed identity of "Concierge/User" or a similar identity for the first (outer) request identity. The WLAN will deliver this identity to the AAA server. The AAA server will execute an EAP authentication with the mobile device. During the EAP, the server delivers its server certificate chain for validation by the end device.

The mobile device validates that the certificate chain is valid. This may suitably comprise ensuring that the server certificate is signed by a certificate authority that is currently stored in the mobile device's list of trusted certificate authority certificates. In an example embodiment, once the chain of the server certificate is validated, the mobile device ensures that the server certificate's common name (CN) field has a domain name that matches the domain name of the service provider the user selected during the notification/selection phase. An SSL/TLS session is run in which the server proves its possession of the private key that is the counterpart of the public key contained within the server certificate.

For an unknown user, e.g. "Concierge/User," the AAA server sends a protected success notification to the mobile device that may contain the URI for an unknown entity (for example a public URI). In addition, the AAA server will provision the layer 2 connection to provide an access level sufficient to obtain the requested service.

Referring again to the example illustrated in FIG. 4, at 442, Concierge Application 402 communicates to Concierge Startup 404 to initiate Concierge services for the selected domain name (Cisco.com in this example). Concierge Startup 404 sends an Association Request frame 444 to AP 406. AP 406 responds with an Association Response frame 446. AP 406 also responds with a "request ID" frame 448. At 450, Concierge Startup 404 responds with an ID of "Concierge," which is sent to AP 406. It should be noted that, if the user or mobile device has an account with the WLAN, the user or mobile device can respond with an ID corresponding with the account. In an example embodiment, the mobile device comprises a credential manager which maintains credentials by domain name, which may optionally be sorted by domain name. The credential manager retrieves the appropriate credentials, for example a username/password combination, for the domain name. In particular embodiments, the mobile device determines from the service advertisement (e.g. from a beacon sent by the AP or from a probe response) whether guest access is allowed. If so, the mobile device can use guest credentials. If the Concierge service does not allow guest access and the credential manger does not have credentials for the domain name, then the mobile device will not attempt to acquire concierge services. Optionally, the mobile device may provide an indication to the user that credentials for the domain are not available. For purposes of this example, a generic 'Concierge' identifier is employed. AP 406 sends an access request with a user ID of 'Concierge' to AAA server 408.

AAA server 408 responds by beginning an EAP-FAST authentication at 454. This includes the server Certificate signed by a public certificate authority, possessing a field corresponding to the advertised domain name and the public key that matches the service provider's private key. AP 406 forwards the server certificate to Concierge startup 404 at 456.

Concierge Startup 404 validates the public certificate received from AP 406 originating from AAA server 408. In an example embodiment, Concierge Startup 404 is configured with public keys from one or more trusted certificate authorities. Concierge Startup 404 validates that the server certificate is signed by one of the trusted certificate authorities. The validation may include validation of several intermediate trusted certificate authorities. In particular embodiments, Concierge Startup 404 verifies a Common Name (CN) field matches a globally unique ID (for example the domain name) that was provided at 428.

If Concierge Startup 404 validates the certificate sent by AP 406, one or more signals are exchanged at 458. This exchange completes the EAP method which includes an SSL/TLS authentication that validates that the AAA server 408 is in possession of the private key that is the counterpart of the public key within the server certificate. At the completion of a successful EAP authentication, the AAA server 408 responds with an access accept message 460 sent to AP 406, and AP 406 responds with an EAP success message 462. At 464, one or more signals are exchanged to establish encryption keys established between the mobile device and AP 406. Upon establishing encryption keys, Concierge Startup 404 notifies Concierge Application 402 at 466 to launch the application (for example a web browser may be started) and provides the URI to where the service may be obtained. Meanwhile, AP 406 allows the mobile device access to the Concierge Server 410, and at 468 Concierge services are provided.

Figure 5:
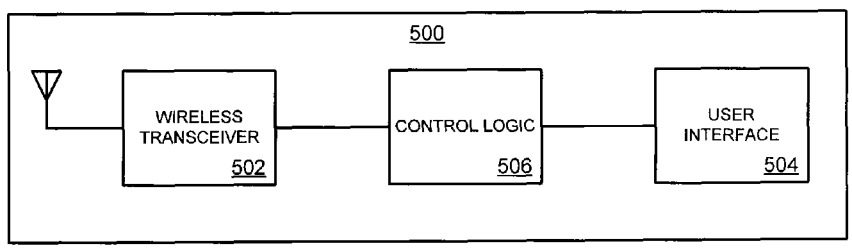
FIG. 5 illustrates an example of a wireless mobile device upon which an example embodiment may be implemented.

FIG. 5 illustrates an example of a wireless mobile device 500 upon which an example embodiment may be implemented. Wireless device 500 is suitably adapted to perform the functionality of mobile device 104 (FIG. 1), mobile device 216 (FIG. 2), Concierge application 402 (FIG. 4), and Concierge Startup 404 (FIG. 4). Wireless device 500 comprises a wireless transceiver 502, user interface 504, and control logic 506 coupled to wireless transceiver 502 and user interface 504. The wireless transceiver 502 is configured to send and receive wireless signals. In an example embodiment, the wireless transceiver 502 also includes physical layer (PHY) processing logic and Media Access Control (MAC) processing logic. User interface 504 suitably comprises an output device for outputting data or signals representative of the data, and an input device for receiving data. The output device may be a visual display device, an audio device, and/or a motion (e.g. vibrating) device. The input device may include a key board, touch screen, mouse, and/or audio input device (e.g. for receiving voice commands). Control logic 506 is configured to extract data from wireless signals and display data representative of the extracted data on user interface 504. Control logic 506 is also configured to send data via wireless transceiver 502 responsive to commands received via user interface 504.

In an example embodiment, control logic 506 is responsive to a signal received from a wireless network by wireless transceiver 502, where the signal comprising data indicating a service available for an application on the wireless network, to output data on user interface 504 indicating that the service is available for the application on the network. The icon may be displayed as a flashing icon alerting the user to the availability of a new service. Control logic 506 is responsive to input received on user interface 504 indicating that the service is requested to validate the wireless network via wireless transceiver 502 and to initiate the application to receive the service from the wireless network responsive to successfully validating the wireless network.

In an example embodiment, control logic 506 is further configured to determine a domain name service provider and a URI to access the service from the signal received by wireless transceiver 502. To validate the wireless network sending the signal, control logic 506 receives a certificate for the wireless network via wireless transceiver 502 and validates that the information in the certificate has been validated by a trusted entity. This is done by ensuring the certificate is signed by a trusted Certificate Authority. In particular embodiments, control logic 506 is configured with public keys for various Certificate Authorities (such as Verisign, Thawte, etc.) which control logic 506 can use to validate the received certificate.

In an example embodiment, control logic 506 validates the service provider by matching a domain name extracted from the certificate with the domain name acquired from the signal advertising the service. In particular embodiments, the certificate comprises a Common Name (CN) field that contains the URI. Finally, the control logic validates the service provider by ensuring it possesses the private key that corresponds to the public key from the certificate.

The application for accessing the service can be a web browser. Once the wireless network is validated, control logic 506 automatically launches the web browser with the domain name that was provided by the wireless network and provides the URI to the service.

In an example embodiment, control logic 506 can operate in an "open mode" as described herein. In open mode, control logic 506 displays data, such as icons, for any wireless network advertising the predefined, e.g. Concierge, services. In an example embodiment, a user of apparatus 500 can use an input device coupled to user interface 504 to select icons to add wireless networks to a pre-approved list, such as a "My Favorites" list as was illustrated in FIG. 3. In another example embodiment, control logic 506 can be configured to automatically add icons for all wireless networks detected offering Concierge services to the "my favorites" list.

In an example embodiment, wireless transceiver 502 receives a second signal from a second wireless network with data representative of a second service available for the application on the second wireless network. Control logic 506 is responsive to the wireless transceiver 502 receiving the second signal to output second data on the output device of user interface 504 indicating that the second service is available for the application on the second network. Thus, a user can select either the first advertised service or the second advertised service for the application.

In an example embodiment, control logic 506 may operate in a 'closed mode.' In closed mode, control logic 506 ignores any signals received from wireless networks advertising Concierge services that are not on a pre-approved list. If a signal is received for a wireless network in the pre-approved list, an icon advertising the service is output (e.g. displayed) on user interface 504.

In an example embodiment, control logic 506 operates in an open mode. In open mode, control logic 506 outputs data to user interface 504 for all wireless networks detected that advertise Concierge services.

In an example embodiment, control logic 506 may receive a plurality of signals from a plurality of wireless networks offering Concierge services concurrently. For example, if the application is not currently executing, control logic 506 will forward data indicating all currently detected wireless networks to user interface 504. If the application is currently running, however, control logic 506 will not forward data to user interface 504 until the application has stopped running.

Figure 6:
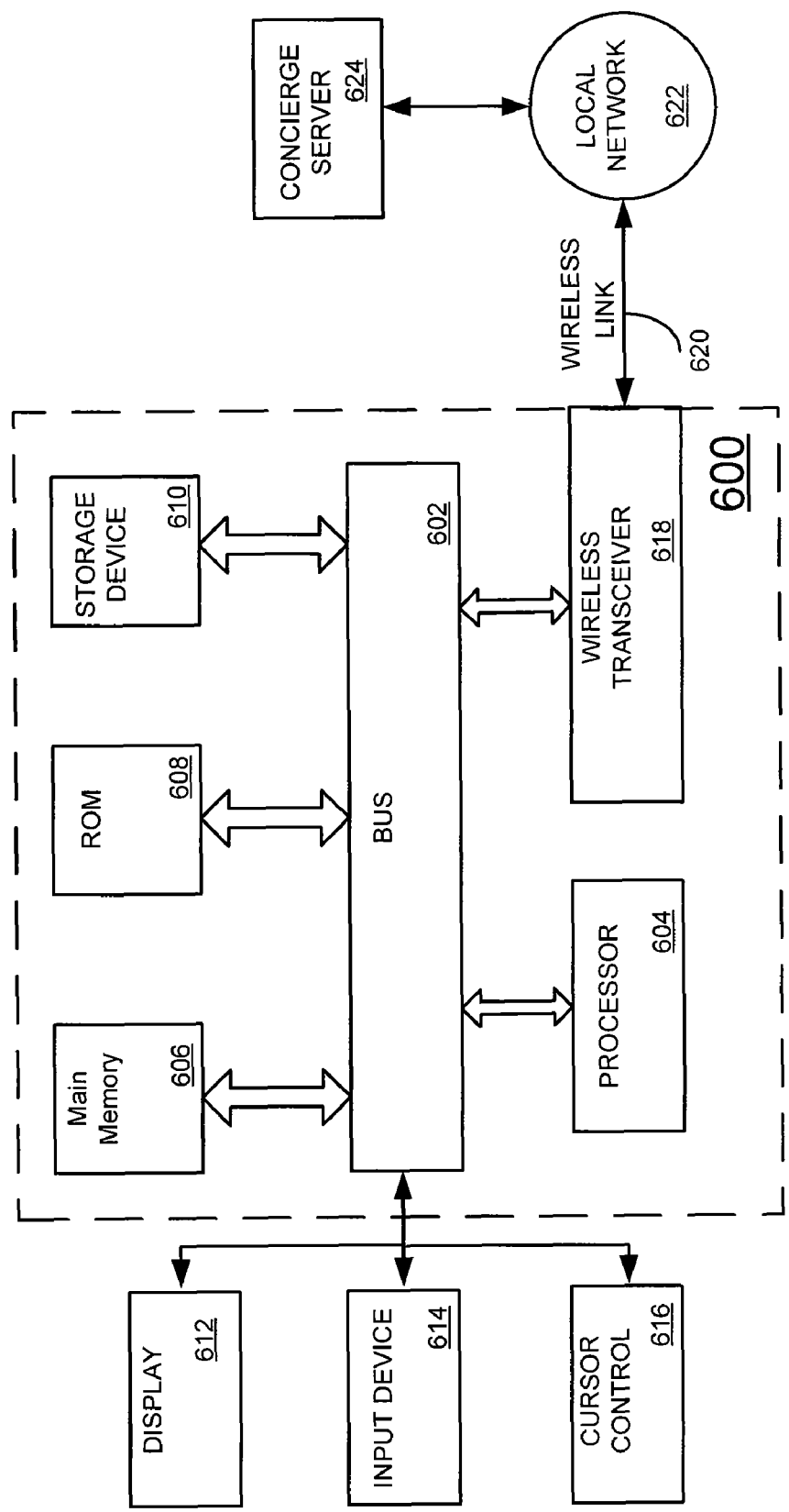
FIG. 6 illustrates a computer system upon which an example embodiment may be implemented.

FIG. 6 illustrates a computer system 600 upon which an example embodiment may be implemented. Computer system 600 includes a bus 602 or other communication mechanism for communicating information and a processor 604 coupled to bus 602 for processing information. Computer system 600 also includes a main memory 606, such as random access memory (RAM) or other dynamic storage device coupled to bus 602 for storing information and instructions to be executed by processor 604. Main memory 606 also may be used for storing a temporary variable or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT) or liquid crystal display (LCD), for displaying information to a computer user. An input device 614, such as a keyboard including alphanumeric and other keys, is coupled to bus 602 for communicating information and command selections to processor 604. Another type of user input device is cursor control 616, such as a mouse, a trackball, or cursor direction keys, for communicating direction information and command selections to processor 604 and for controlling cursor movement on display 612. This input device typically has two degrees of freedom in two axes, a first axis (e.g. x) and a second axis (e.g. y), that allows the device to specify positions in a plane.

An aspect of the example embodiment is related to the use of computer system 600 for a Concierge Application Launcher. According to an example embodiment, the Concierge Application Launcher is provided by computer system 600 in response to processor 604 executing one or more sequences of one or more instructions contained in main memory 606. Such instructions may be read into main memory 606 from another computer-readable medium, such as storage device 610. Execution of the sequence of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement an example embodiment. Thus, embodiments described herein are not limited to any specific combination of hardware circuitry and software.

The term "computer-readable medium," as used herein, refers to any medium that participates in providing instructions to processor 604 for execution. Such a medium may take many forms, including but not limited to non-volatile media and volatile media. Non-volatile media include, for example, optical or magnetic disks, such as storage device 610. Volatile media include dynamic memory such as main memory 606. Common forms of computer-readable media include, for example, floppy disk, flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 604 for execution. For example, the instructions may initially be borne on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a wireless transceiver 618 coupled to bus 602. Wireless transceiver 618 provides a two-way data communication coupling computer system 600 to a wireless link 620 that is connected to a local network 622.

Communication link 620 typically provides data communication through one or more networks to other data devices. For example, network link 620 may provide a connection through local network 622 to a Concierge server 624 and to appropriate AAA servers (not shown).

In an example embodiment, when wireless transceiver 618 detects a wireless link 620 to a wireless local area network (WLAN) 622, wireless transceiver 618 may determine whether the WLAN supports concierge services based on advertisements received in beacon frames (such as Information Elements "IEs") or may send a probe frame and determine whether concierge services are available. If concierge service is available on WLAN 622, an icon or other data may be output on display 612. The user can consent to concierge services via input device 614. Validation and application launching as described herein is provided by processor 604 communicating with local network 622 via wireless transceiver 618.

In view of the foregoing structural and functional features described above, methodologies in accordance with an example embodiment will be better appreciated with reference to FIGS. 7-10. While, for purposes of simplicity of explanation, the methodologies of FIGS. 7-10 are shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect the example embodiment. The methodologies described herein are suitably adapted to be implemented in hardware, software, or a combination thereof.

Figure 7:
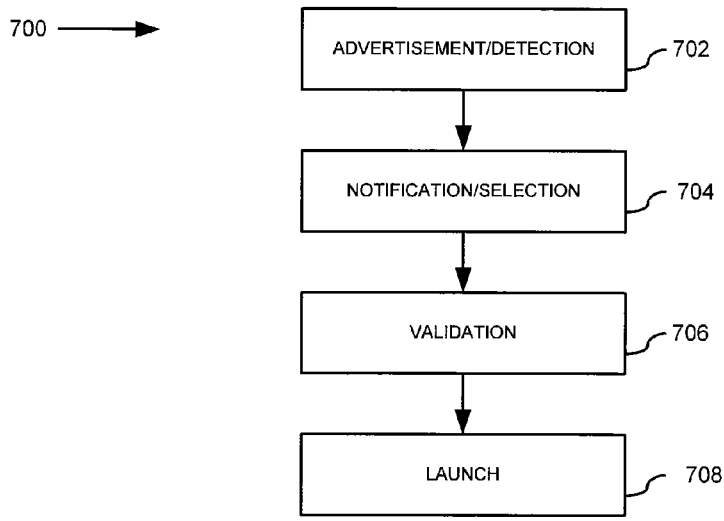
FIG. 7 illustrates an example methodology in accordance with an example embodiment.

FIG. 7 illustrates an example methodology 700 in accordance with an example embodiment. Methodology 700 comprises advertising (by a WLAN) and detection (by a mobile device) as illustrated by 702. A network device may advertise Service Directory Listing services by including data such as an Information Element (IE) in a beacon. Alternatively, the mobile device may send a probe frame, and the device on the network responding to the probe frame may include an IE in a probe response. In an example embodiment, the mobile device may send a frame requesting available services from the network, and the network device providing the response can send a frame that advertises Concierge services. The frame advertising the Concierge services will include a URI where the service may be obtained after connection and a domain name for the service provider of the Concierge services.

At 704, notification and selection of the Concierge services is performed. A mobile device can output data representative of the available Concierge services. For example, an icon may be displayed on a video screen. Optionally, the icon may be flashing to attract attention. As another example, an audio output may announce the availability of Concierge services. The mobile device does not activate a Concierge service until a user has selected a service.

At 706 validation occurs. Validation can use any suitable technique. For example, as described herein, the mobile device can request or otherwise receive a certificate for the wireless network signed by a trusted certificate authority. The mobile device can validate the certificate. The certificate may include data, such as a domain name, which can enable the mobile device to verify it belongs to the entity advertising the Concierge service. Finally, the certificate will include a public cryptographic element that can be used to ensure that the wireless network is in communication with an entity that possesses the corresponding private key. For example, the mobile device may match the domain name provided in the advertisement with the domain name provided in the certificate. In an example embodiment, the domain name is acquired in a predefined field, such as a common name (CN) field, of the certificate. If the user has an account with the WLAN, the user may opt to log in. Otherwise, the mobile device can log onto the network with a guest account such as Concierge User.

At 708, upon successfully validating the WLAN, the mobile device launches the application to receive the selected Concierge service from the WLAN and provides it with the URI from the advertisement/detection stage 702. In an example embodiment, the application is a web browser, and the web browser is launched using the URI provided in the advertisement.

Figure 8:
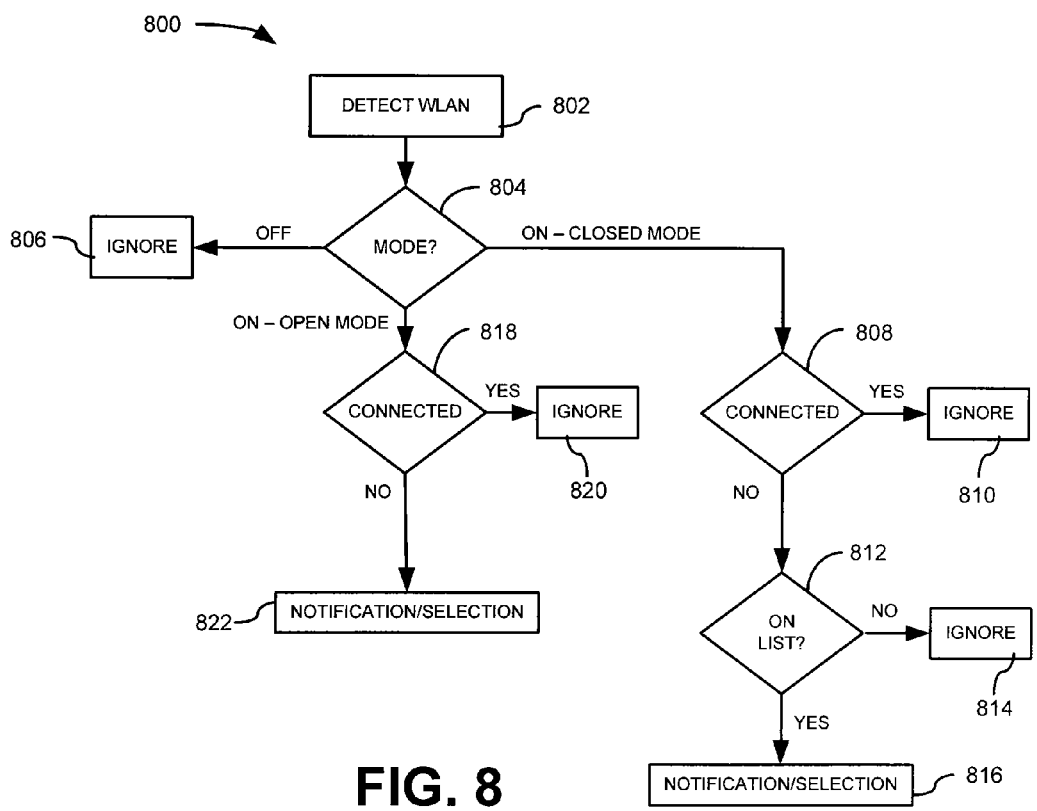
FIG. 8 illustrates an example methodology for responding to an advertisement signal from a WLAN.

FIG. 8 illustrates an example methodology 800 for responding to an advertisement signal from a WLAN. Methodology 800 may be employed by a mobile device during detection/notification 702 as described in FIG. 7.

At 802, a mobile device detects a wireless local area network (WLAN) advertising that it is providing Concierge services. At 804, the current mode of operation for the mobile device is determined.

If at 804 the current mode has Concierge services turned off (OFF), the Concierge service signals is ignored, as illustrated at 806. The mobile device will continue to ignore Concierge service signals until the mobile device enters an "ON" mode.

If at 804 the current mode is determined to be "ON" and "CLOSED" (ON—CLOSED MODE), then only WLANs on a pre-approved list will be output for selection. At 808, the mobile device determines whether the application is currently running. If the application is currently running, e.g. receiving Concierge services from another WLAN or from a different concierge server on the same WLAN (YES), at 810 the Concierge signals are ignored until the application completes running. If at 808 it was determined that the application for receiving Concierge services is not running (NO), at 812 the mobile device determines whether the WLAN is on a pre-approved (such as My Favorites) list. If the WLAN is not in the pre-approved list (NO), at 814 the signal is ignored. If, however, at 812 the mobile device determines the WLAN is in pre-approved list (YES), mobile device proceeds to the notification stage at 816. During the notification stage, the mobile device produces an output, such as an audio and/or video output, to notify a user of the mobile device that Concierge services for the WLAN are available.

If at 804 the mobile node is operating in the open mode (ON—OPEN MODE), the mobile node will proceed to the notification selection phase unless the application is currently busy running a Concierge application provided by another WLAN (or another concierge server on the same WLAN). Accordingly, at 818 the mobile node determines whether the application for receiving Concierge services is currently in use and, if so (YES), at 820 Concierge signals from the WLAN are ignored and not output to the user. If, however, at 818 the mobile device determines that the application is not connected to another WLAN (NO), at 822 the mobile device proceeds to the notification/selection phase.

FIG. 9 illustrates an example methodology 900 for validating a selected WLAN by a mobile device desiring Concierge services from the WLAN. At 902, the mobile device receives an identifier, such as a domain name, for the service provider on the WLAN providing the advertised Concierge services. In an example embodiment, the identifier is received in a network services directory frame.

At 904, authentication begins. This may be responsive to the mobile device receiving an input indicating that Concierge services from the WLAN are desired.

At 906, the mobile device receives a certificate for the service provider of the Concierge services on the WLAN. In an example embodiment, the certificate is signed by a trusted certificate authority, such as Verisign, Thawte, Geotrust, Comodo, GoDaddy, etc. In particular embodiments, the certificate has a hash that is signed by a private key of the trusted certificate authority, and the mobile device has a public key for the certificate authority, which the mobile device can use for validating that the signed hash matches the hash of the information within the certificate.

At 908, the mobile device determines if the certificate is valid. If the certificate is not valid (NO), then at 916 the process is aborted, as the WLAN failed authentication. In an example embodiment, the mobile node may be configured to retry validation one or more times. If validation still fails, then the process still aborts.

At 910, the mobile device extracts an identifier from the certificate. For example, the certificate may suitably comprise a common name (CN) field that contains an identifier for the WLAN. If the identifier for the WLAN does not match identifier received at 906 (NO), then at 916 the process is aborted because validation failed.

At 912, the mobile node determines whether the certificate has been revoked. If the certificate has been revoked (YES), then the process is aborted at 916 because validation failed.

At 914, the mobile node determines that the wireless network is communicating with an entity that possesses the private key that corresponds to the public key within the server certificate. If this is not proven (NO), then the process is aborted at 916 because validation failed.

If the certificate is determined to be valid (at 908), the common name field matches the advertised service provider for the WLAN (at 910), the certificate has not been revoked (NO at 912), and the wireless network is shown to have access to a private key that corresponds to the public key in the server certificate (YES at 914), at 918 the application is launched to receive Concierge services. In an example embodiment, a web-based application such as a browser is launched and uses a URI provided by the WLAN for receiving Concierge services.

FIG. 10 illustrates an example methodology 1000 for adding a WLAN to a contact list. In this example embodiment, the mobile device is operating in an open mode, as described herein. The open mode begins at 1002. At 1004, the mobile device receives a URI and/or domain name for a provider of Concierge services for a WLAN. At 1006, the mobile node determines whether to add the URI/domain name to the pre-arrived (favorites) list. In an example embodiment, all detected URI/domain names are automatically added to the list, in which case methodology 1000 continues to 1008. In another example embodiment, the mobile device displays an output and prompts the user for an input to determine whether the URI/domain name should be added to the favorites list. If an input is received indicating the user wants the URI/domain name added to the favorites list (YES), processing continues to 1008, where the domain name and optionally an icon are added to the favorites list; otherwise processing skips to 1010.

At 1010, data representative of the domain name is output to enable a user to select Concierge services if desired. If an input is received indicating that a user desires to launch the application to receive Concierge services (YES), then at 1012 the application is launched. The application may be provided with the domain name provided by the WLAN to access Concierge services on the WLAN. If, however, at 1010 no input is received (NO), then the mobile device will continue to display the domain name and/or icon for the Concierge service as long as the mobile node remains within range of the WLAN, in which case 1010 and 1014 will repeat until either an input is received to launch the application or the mobile device can no longer detect the WLAN.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications, and variations that fall within the spirit and scope of the appended claims interpreted in accordance with the breadth to which they are fairly, legally, and equitably entitled.

The invention claimed is:

1. An apparatus, comprising:
a wireless transceiver;
an input device;
an output device; and
control logic operatively coupled to the wireless transceiver, the input device, and the output device;
wherein the control logic receives a signal received from a wireless network via the wireless transceiver, the signal comprising data indicating a service is available for an application via the wireless network;
wherein, the control logic is selectively operable in a first mode to output data on the output device indicating that the service is available for the application on the network;
wherein the control logic is selectively operable in a second mode to determine from the signal a service provider for providing the service and to determine whether the service provider is on a pre-approved list of approved service providers, the control logic selectively outputting data on the output device indicating that the service is available for the application on the network responsive to determining the service provider is on the pre-approved list of service providers;
wherein the control logic is selectively operable in a third mode to discard the data indicating the service is available from the application and without outputting the data indicating the service is available on the output device; and,
wherein the control logic is responsive to receiving input from the input device indicating the service is requested to validate the wireless network and to initiate the application to receive the service responsive to successfully validating the wireless network.

2. The apparatus of claim 1, wherein the control logic is further configured to determine a domain name for the wireless network from the signal;
wherein the control logic is further configured to validate the wireless network by requesting a certificate for the wireless network via the wireless transceiver; and
wherein the control logic validates the wireless network by matching a Uniform Resource Identifier extracted from the certificate with the domain name determined from the signal.

3. The apparatus of claim 2, wherein the certificate further comprises a common name field; and
wherein the control logic is further configured to extract the domain name from the common name field of the certificate.

4. The apparatus of claim 1, wherein the application is a web browsing application.

5. The apparatus of claim 1, wherein the data output on the output device is an icon displayed on a display device.

6. The apparatus of claim 1, wherein the control logic is further configured to add data representative of the associated wireless network to the pre-approved list responsive to an input received via the input device.

7. The apparatus of claim 1, wherein the control logic is further configured to automatically add data representative of the associated wireless network to the pre-approved list responsive to the control logic being in a predefined operating mode that automatically adds data from detected associated wireless networks to the pre-approved list.

8. The apparatus of claim 1, wherein the associated wireless transceiver receives a second signal from a second associated wireless network with data representative of a second service available for the application on the second associated wireless network; and
wherein control logic is responsive to the wireless transceiver receiving the second signal to output second data on the output device indicating that the second service is available for the application on the second associated wireless network.

9. A method, comprising:
receiving a first signal from an associated wireless network, the first signal comprising data indicating a service is available for an application;
determining a mode of operation responsive to receiving the first signal;
selectively outputting data from the first signal indicating the service is available for the application from the associated wireless network responsive to determining the mode of operation is a first mode, wherein while in the first mode, all service advertisements are output;
selectively determining whether a source of the service is on a pre-approved list responsive to determining the mode of operation is a second mode of operation, wherein only service advertisements from sources in the pre-approved list are output;
selectively outputting the data from the first signal indicating the service is available responsive to determining the mode of operation is the second mode and the source of the first signal is on the pre-approved list;
selectively discarding the data from the first signal responsive to determining the mode of operation is a third mode, wherein while in the third mode no advertisements are output;
receiving an input requesting the service;
validating the associated wireless local area network advertising the service; and
launching the application to receive the service responsive to successfully validating with the associated wireless network.

10. The method of claim 9, wherein validating the associated wireless network further comprises:
   determining a domain name for the service provider from the first signal;
   receiving a certificate from the associated wireless network;
   validating that the certificate was signed by a trusted certificate authority;
   extracting a domain name from the certificate; and
   verifying that the domain name extracted from the certificate matches the domain name determined from the first signal.

11. The method of claim 10, wherein the domain name extracted from the certificate is extracted from a common name field.

12. The method of claim 10, wherein the application is a web browsing application.

13. The method of claim 9, wherein the outputting data further comprises displaying a flashing icon on a display device.

14. The method of claim 9, further comprising:
   receiving a second signal from an associated second wireless network advertising a second service for the application;
   determining whether the application is receiving service from another associated wireless network; and
   outputting data indicating the second service is available concurrently with data indicating the first service is available responsive to determining the application is not receiving the second service from another associated wireless network.

15. An apparatus, comprising:
   means for receiving a signal from an associated wireless network comprising data indicating a service is available for an application;
   means for operating in a first mode, wherein while operating in the first mode, data indicating the service is available for the application from the associated wireless network is output to a user interface means;
   means for operating in a second mode, comprising means for determining whether a service provider associated with the service belongs to a predefined list of service providers, wherein the means for operating in the second mode comprises means for outputting to the user interface data indicating the service is available from the associated wireless network responsive to determining the service provider associated with the service belongs to the predefined list of service providers;
   means for operating in a third mode, comprising means for discarding the data indicating the service is available while operating in the third mode and not outputting the data indicating the service is available on the user interface;
   means for receiving an input requesting the service output on the user interface;
   means for validating the associated wireless local area network advertising the service; and
   means for launching the application to receive the service responsive to successfully validating with the associated wireless network.

16. The apparatus of claim 15, wherein the means for validating the associated wireless network further comprises:
   means for determining a domain name for the service provider from the signal;
   means for receiving a certificate from the associated wireless network;
   means for validating that the certificate was signed by a trusted certificate authority;
   means for extracting a domain name from the certificate; and
   means for verifying that the domain name extracted from the certificate matches the domain name determined from the signal.

* * * * *